June 29, 1965     O. E. PETER ETAL     3,191,923
ANNULAR SPRING WITH CLOSED INNER AND OUTER RINGS
Filed May 15, 1963                              2 Sheets-Sheet 1

Inventors
OSKAR E. PETER and
LOTHAR PETER
By Bailey, Stephens & Huettig
Attorneys June 29, 1965    O. E. PETER ETAL    3,191,923
ANNULAR SPRING WITH CLOSED INNER AND OUTER RINGS
Filed May 15, 1963    2 Sheets-Sheet 2

Inventors
Oskar E. Peter
And Lothar Peter
By
Bailey, Stephenson, Huettig
Attorneys United States Patent Office 3,191,923
Patented June 29, 1965

3,191,923
ANNULAR SPRING WITH CLOSED INNER AND
OUTER RINGS
Oskar E. Peter, Stuttgarter Strasse 34, Brackenheim, Germany, and Lothar Peter, See Strasse 31, Guglingen, Germany
Filed May 15, 1963, Ser. No. 280,572
5 Claims. (Cl. 267—9)

The present invention relates to an annular spring which consists of closed inner and outer rings and may be used, for example, for cushioning and shock-absorbing purposes.

It is already known to produce annular springs which consist of closed inner and outer rings with corresponding conical contact surfaces of a highly resistant spring steel. When such a spring is acted upon in the axial direction, the inner rings which are provided with tapered surfaces which are inverted relative to each other are compressed, while the outer rings which are provided with corresponding tapered surfaces are expanded. The inner rings are then subjected to compression and the outer rings to traction. Such annular springs possess a very high work capacity. Since high radial pressures occur between the tapered surfaces of the rings, great frictional forces also occur which result in the generation of considerable heat. For this reason, such annular springs may be employed only up to a certain limit at which the temperatures which are produced in the spring by the impulses exerted thereon are not as yet so high that the lubricant in the spring will be dissolved. If this occurs, the tapered surfaces of the rings sliding along each other would soon become worn and the spring would therefore become useless. It has therefore been possible to employ the annular springs of this conventional type only in those cases in which the springs are acted upon only at certain times and when the heat of the friction can be adequately dissipated, that is, for example, when they are employed as buffer springs in rail vehicles or for neutralizing undesirable shock impulses in presses or the like. These known annular springs could also not be used as bearing springs for vehicles for the additional reason that, because of their high frictional resistance, they will transmit high-frequency vibrations from the road to the body of the vehicle.

A further disadvantage of the conical design of the inner and outer rings of the conventional annular springs is the fact that the cross-sectional areas of the rings at right angles to the spring axis vary in size which has the result that during the strokes of the spring the rings will be subjected to unequal radial stresses which seriously impairs the total resilience and shock absorption of the spring. In order to overcome this advantage and to attain rings of substantially uniform cross-sectional sizes, the wall surfaces of the conical inner and outer rings have in some cases been provided with arcuate apertures. This requires, however, additional operations in the production of such springs which increase the cost thereof. Furthermore, the production of annular springs with corresponding conical surfaces on the inner and outer rings is generally very expensive because of the required accuracy at which these conical surfaces have to be made.

It is an object of the present invention to overcome the above-mentioned disadvantages of the known types of annular springs and to produce an annular spring the parts of which may be assembled so as to produce any desired spring characteristic, either with a strong or a low friction, and which furthermore is of a relatively simple structure and may therefore be easily and inexpensively produced. According to the invention, the inner and outer rings have cylindrical wall surfaces between which two superimposed rows of profiled strips with corresponding tapered surfaces are arranged adjacent to each other in a manner so as to fill out the annular space between the inner and outer rings. When the new annular spring is compressed and released, only the superimposed profiled strips and the corresponding tapered surfaces thereof move relative to each other, whereas the cylindrical wall surfaces of the inner and outer rings which engage with the profiled strips are subjected by the latter only to pressure. When the new spring is acted upon in the axial direction, the cross-sectional areas of the cylindrical inner and outer rings are stressed equally in radial directions whereby the efficiency of the spring is increased.

By means of the present invention it is now also possible to manufacture annular springs of light metal which are very efficient in actual practice since the hard oxide coatings of so-called corundum which cannot be prevented from forming on the cylindrical wall surfaces of the inner and outer rings of light metal will no longer impair the spring since the profile strips which are provided with tapered surfaces are interposed between these cylindrical surfaces. When springing back and forth, the rings of light metal no longer slide directly along each other and therefore there is no longer any danger that hard metal particles may be torn out of the surfaces, that the surfaces may be seriously damaged, or that cold welding may occur. The advantageous properties of light metals may therefore now be fully utilized also for producing annular springs. They consist, for example, in the smaller coefficient of elasticity of light metal of 700,000 kg./cm.$^2$ as against that of steel of 2,100,000 kg./cm.$^2$. Consequently annular springs of light metal have three times the resilience of annular springs of steel which are subjected to the same stresses and have the same ultimate stress values. Such light metal springs also have a much better heat conductivity so that the considerable temperatures which are produced during a continuous operation of the springs will be quickly dissipated and the oil filter between the tapered surfaces of the profiled strips will therefore remain effective for a long time. Due to their particular construction, the new annular springs of light metal are therefore very suitable for being in operation continuously. A very important advantage of such light metal springs over similar springs of steel is also their much lower weight which renders them especially suitable for being installed, for example, in airplanes.

A further advantage of the present invention is the fact that the profiled strips with tapered contact surfaces which are inserted as separate elements between the inner and outer rings may when worn be easily and quickly replaced by new profiled strips, and that the cylindrical inner and outer rings remain unaffected and may be used almost indefinitely. The profiled strips themselves may be simple stamped parts, and the oil grooves may be easily impressed therein in the same or a separate stamping operation. If desired, the profiled strips may also be very economically cast to the proper dimensions. The inner and outer rings of the new spring are simple cylindrical turned parts and it is possible to produce springs with different spring characteristics simply by changing the angle of taper of the profiled strips and thus the pitch of the springs without requiring any changes to be made on the inner and outer rings. If according to another feature of the invention one of the two superimposed rows of profiled strips is made of a material with a coefficient of friction different from that of the other row, it is also possible to vary the spring characteristic in accordance with the particular cushioning and shock-absorbing requirements which the spring should fulfill.

According to a further feature of the invention, the profiled strips may be provided with corresponding plane tapered surfaces, while their outer contact surfaces which engage with the rings are made of an arcuate shape. This arcuate shape of the outer contact surfaces of the profiled strips permits them to be employed in connection with rings of different diameters. In order to attain an all-around surface contact between the profiled strips and the cylindrical rings, it is advisable when testing the annular spring to exert a pressure upon the rings in excess of the elastic limit of the rings so that the outer arcuate shape of the profiled strips will be permanently impressed into the peripheral bearing surfaces of the inner and outer rings and these bearing surfaces will thus be enlarged as compared with those of normal cylindrical surfaces. A further advantage of the invention is that, by thus being impressed by the profiled strips, the material of the cylindrical rings is compressed to a higher solidity.

It is another object of the invention to vary the spring characteristic of the annular spring in accordance with the particular cushioning and shock-absorbing requirements upon the spring by providing the profile strips of one spring column which are arranged one behind the other with tapered surfaces of different angularity. Another feature of the invention consists of inserting between the cylindrical inner and outer rings of the annular spring two superimposed rows of conical pins in inverted positions relative to each other so that each pin of one row is in linear engagement with the two adjacent pins of the other row and all conical pins of each row are in linear engagement with the cylindrical surface of the adjacent ring. Such an annular spring produces very little friction and may be used in all those cases where strong friction and vibration damping properties are undesirable, for example, when used as a bearing spring for vehicles.

The various features and advantages of the present invention will become further evident from the following detailed description thereof which is to be read with reference to the accompanying drawings, in which:

FIG. 8 shows an axial section of a part of an annular spring according to a further modification of the invention; while

Figure 1:
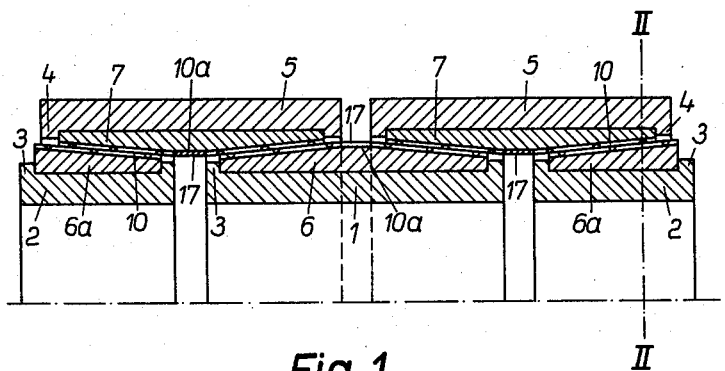
FIG. 1 shows an axial section of a part of an annular spring according to the invention.
Figures 2, 3:
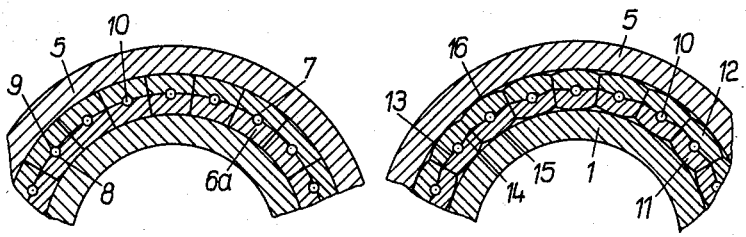
FIG. 2 shows a cross section which is taken along line II—II of FIG. 1.
FIG. 3 shows a view similar to FIG. 2 of a modification of the invention.

The annular spring as illustrated in FIGS. 1 and 2 comprises a central cylindrical inner ring 1 and a pair of cylindrical inner end rings 2, all three of which are provided with radial flanges 3. The spring further comprises a pair of cylindrical outer rings 5 which are concentric to and radially spaced from the inner rings 1 and 2 and are provided with radial flanges 4. The annular space between the cylindrical inner and outer rings 1, 2, and 5 is filled out completely by two superimposed rows of profiled strips 6, 6a and 7 which have corresponding arcuate tapered surfaces 8 and 9 and are provided with oil grooves 10. Centrally of their length, each profiled strip 6 and 7 is provided with a groove 10a into which a thin spring ring 17 is inserted for maintaining the profiled strips 6 and 7 in their proper positions. The radial flanges 3 and 4 on the inner and outer rings 1, 2 and 5 prevent the profiled strips 6, 6a, and 7 from shifting in the axial direction. When a pressure is exerted in the axial direction upon the annular spring the cylindrical inner and outer rings 1, 2 and 5 are respectively compressed or expanded elastically in the radial directions by the intermediate profiled strips 6, 6a, and 7 and their corresponding arcuate tapered surfaces 8 and 9. If the annular spring should have a greater elongation or shock course, several cylindrical inner and outer rings with intermediate profiled strips may be connected in series behind each other.

Figure 4:
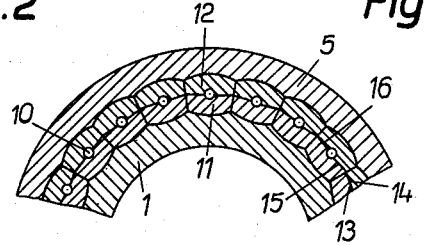
FIG. 4 shows a view similar to FIG. 3, in which the rings of the spring according to FIG. 3 are shown after being loaded beyond the elastic limit.

According to the modification of the invention as illustrated in FIGS. 3 and 4, two superimposed rows of adjacent profiled strips 11 and 12 with corresponding plane tapered surfaces 13 and 14, oil grooves 10 in these surfaces, and arcuate outer contact surfaces 15 and 16 are mounted between and in engagement with the cylindrical inner and outer rings 1, 2 and 5. FIGURE 4 shows the profiled strips 11 and 12 between the rings 1, 2 and 5 after these rings of the annular spring are subjected to a load exceeding their elastic limit so that the arcuate contact surfaces 15 and 16 of the profiled strips 11 and 12 are pressed into the rings 1, 2 and 5 and the material of the rings is thereby solidified.

Figure 5:
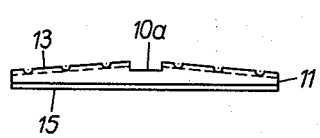
FIG. 5 shows a side view of a profiled strip for the inner ring of a spring according to FIGS. 3 and 4.
Figure 6:
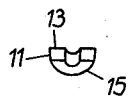
FIG. 6 shows an end view of the profiled strip according to FIG. 5.
Figure 7:
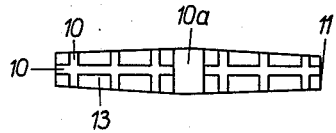
FIG. 7 shows a plan view of the profiled strip according to FIGS. 5 and 6.

FIGS. 5 to 7 illustrate a profiled strip 11 for the annular spring according to FIGS. 3 and 4 with plane tapered surfaces 13, oil grooves 10 in these surfaces, a central groove 10a for receiving the spring ring 17, and an arcuate contact surface 15 for engaging with the inner ring 1.

Figure 8:
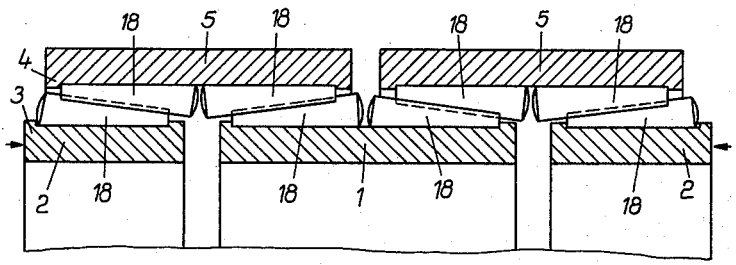
Figure 9:
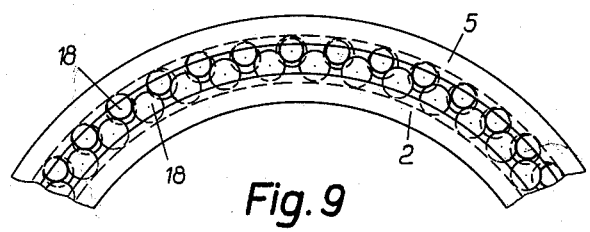
FIG. 9 shows an end view of the part of the annular spring according to FIG. 8.

The annular spring according to the further modification of the invention as shown in FIGS. 8 and 9 has inner rings 1 and 2 and outer rings 5 of the same shape as those of the annular spring according to FIGS. 1 and 2. However, these inner rings 1 and 2 and the outer rings 5 are separated from each other by two rows of superimposed conical pins 18 which are disposed inversely to each other in such a manner that one pin 18 of one row is in linear engagement with the two adjacent pins 18 of the other row, while all pins 18 of one row are in linear engagement with the cylindrical surface of the respective adjacent ring 1, 2, or 5. The radial projections 3 and 4 of rings 1, 2 and 5 prevent the conical pins 18 from sliding in their axial directions.

When the annular spring according to FIGS. 8 and 9 is being compressed, the inner rings 2 at the ends of the spring together with their conical pins 18 are moved inwardly toward each other and therefore the outer rings 5 are also moved toward each other by the outer conical pins 18 which are in linear engagement with the inner conical pins 18. This movement is also transmitted to those conical pins 18 which engage with ring 1. Consequently, the inner rings 1 and 2 are elastically compressed in radial directions, while the rings 5 are elastically expanded in radial directions.

Although our invention has been illustrated and described with reference to the preferred embodiments thereofe, we wis hto have it understood that it is in no way limited to the details of such embodiments, but is capable of numerous modifications within the scope of the appended claims.

Having thus fully disclosed our invention, what we claim is:

1. An annular spring comprising closed concentric inner and outer metal rings radially spaced from each other so as to form an intermediate annular space and having cylindrical surfaces facing each other, and a plurality of separate profile strips within and substantially filling out said annular space, said profiled strips forming two superimposed annular rows of strips extending around said space inverted relative to each other and having corresponding tapered surfaces engaging with each other, said rows of strips each directly engaging one of the said metal rings.

2. An annular spring as defined in claim 1, wherein said cylindrical inner and outer rings have radial flanges engaging ends of the strips for preventing said profiled strips from shifting in the axial direction.

3. An annular spring as defined in claim 1, wherein each of at least some of said profiled strips each has a groove at a point centrally of its length, and further comprising a spring ring in said grooves for maintaining said strips in the proper position.

4. An annular spring as defined in claim 1, wherein the profiled strips in one row consist of a material having a coefficient of friction different from that of the material of the strips of the other row.

5. An annular spring as defined in claim 1, wherein each of said profiled strips comprises a conical pin, said pins of one row being tapered inversely to the pins of the other row so that each pin of one row is in linear engagement with the two adjacent pins of the other row and all pins of each row are in linear engagement with the cylindrical surface of the adjacent ring.

References Cited by the Examiner

UNITED STATES PATENTS

| | | |
|---|---|---|
| 1,009,696 | 11/11 | Simpson. |
| 1,462,892 | 7/23 | Washburn. |
| 1,914,479 | 6/33 | Brooks _____ 267—9 X |
| 2,669,447 | 2/54 | O'Connor _____ 267—1 |
| 3,073,585 | 4/60 | Hanle _____ 267—9 |

FOREIGN PATENTS

| | | |
|---|---|---|
| 142,128 | 7/51 | Australia. |
| 553,606 | 5/43 | Great Britain. |

ARTHUR L. LA POINT, *Primary Examiner.*